(No Model.)

G. GOEWEY.
SPRING.

No. 339,762. Patented Apr. 13, 1886.

Witnesses

Inventor.
George Goewey.
per Thomas J. Bewley. Atty

UNITED STATES PATENT OFFICE.

GEORGE GOEWEY, OF PHILADELPHIA, PENNSYLVANIA, ASSIGNOR OF ONE-HALF TO JEREMIAH G. SHAW, OF BIDDEFORD, MAINE.

SPRING.

SPECIFICATION forming part of Letters Patent No. 339,762, dated April 13, 1886.

Application filed January 14, 1886. Serial No. 188,596. (No model.)

*To all whom it may concern:*

Be it known that I, GEORGE GOEWEY, a citizen of the United States, residing at Philadelphia, in the county of Philadelphia and State of Pennsylvania, have invented a new and useful Improvement in Springs, of which the following is a specification.

Helical springs have heretofore been made of a solid bar or rod of steel, which added considerable unnecessary weight, trouble in coiling, and expense in construction In hardening springs constructed in accordance with known methods, the temper rarely extended, but a slight distance within the surface of the metal, merely forming a casehardened bar, while the inelasticity of the core was communicated to the bar, causing inequalities of resiliency and frequent breaking of the springs.

The object of my invention is to overcome these difficulties, and construct a spring with an equality of temper, greater resiliency, and at lessened cost of manufacture; and the invention consists of a helical or coiled spring constructed of a seamless tubular bar or rod of steel, of cylindrical, square, triangular, or other desired shape in its transverse section, that may be best adapted for the purpose intended.

Figure 1:
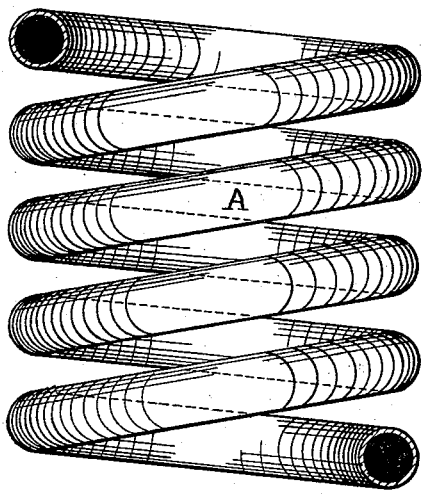
Figure 2:
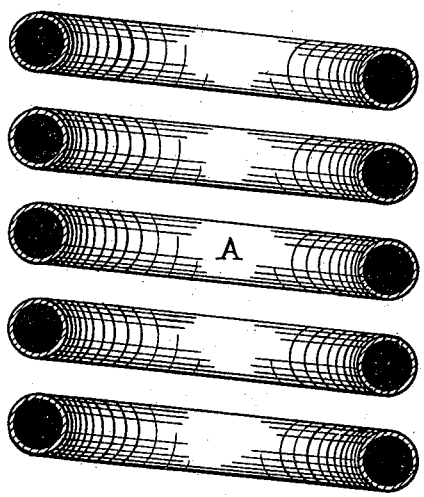
Figure 3:
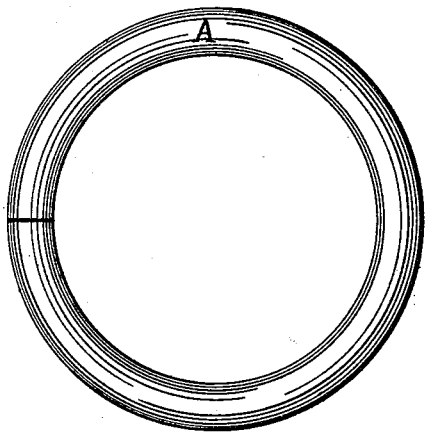

In the accompanyings drawings which make a part of this specification, Figure 1 is a side elevation of my improved spring. Fig. 2 is a vertical section of the same. Fig. 3 is a plan view.

A represents a helical or coiled spring, which in the present instance I have represented as being constructed of a cylindrical seamless tubular bar, or rod; but do not confine myself to the use of a bar or rod cylindrical in transverse section, as triangular, square, oval, or other shape may be found suitable for some purposes.

The bar or rod may be coiled into the connected helices to form a spring by any known mechanical device; and as the seamless tubular bar permits of rapid heating and of the entrance of air upon its internal surface a positive and even temper may be readily obtained; besides the spring will have increased resiliency over the solid rod on account of its equal temper, and with a much lessened tendency to fracture.

An equal amount of metal in a cylindrical seamless tubular rod or bar formed into a spring, to that of a solid bar coiled in like manner, will withstand much greater strain and pressure, and produce a more active spring.

What I claim as my invention, and desire to secure by Letters Patent, is—

A helical spring formed of a seamless metallic tube of any shape in the transverse section, substantially as herein shown and described.

GEORGE GOEWEY.

Witnesses:
   THOMAS J. BEWLEY,
   ROBERT S. KNOX.